United States Patent [19]

Kuehn, Jr.

[11] 3,982,987

[45] Sept. 28, 1976

[54] METHOD AND APPARATUS FOR DEREELING INTERLEAVED TAPES

[75] Inventor: Riley Kuehn, Jr., Auburn, Wash.

[73] Assignee: The Boeing Company, Seattle, Wash.

[22] Filed: May 19, 1975

[21] Appl. No.: 578,878

[52] U.S. Cl............................... 156/361; 156/378; 156/584
[51] Int. Cl.² ........................................ B32B 31/00
[58] Field of Search.... 156/361, 350, 351, 540–542, 156/584; 74/324, 37, 165, 166; 226/24, 32, 37, 45, 115, 117, 120, 134, 136, 152, 156, 157, 181, 188; 242/65

[56] References Cited
UNITED STATES PATENTS

| | | | |
|---|---|---|---|
| 556,802 | 3/1896 | Boyle............................... | 74/166 X |
| 1,735,689 | 11/1929 | Maas............................... | 156/584 X |
| 2,034,063 | 3/1936 | Stacey............................ | 226/117 X |
| 2,680,468 | 6/1954 | Lewis.............................. | 156/324 |
| 2,978,158 | 4/1961 | Herr............................... | 226/156 X |
| 3,428,509 | 2/1969 | Messmer......................... | 156/361 |
| 3,447,992 | 6/1969 | Allen et al. .................... | 156/361 |
| 3,556,368 | 1/1971 | René.............................. | 226/115 X |
| 3,619,571 | 11/1971 | Kage et al...................... | 226/120 X |
| 3,798,108 | 3/1974 | Ioannilli......................... | 156/584 X |
| 3,887,419 | 6/1975 | Geschwender.................. | 156/361 X |

Primary Examiner—David A. Simmons
Attorney, Agent, or Firm—Christensen, O'Connor, Garrison & O'Connor

[57] ABSTRACT

In a pultrusion system, a plurality of tape plies made of resin impregnated filaments or fibers are laminated by combining the plies into a longitudinal composite of tapes and pulling the combined tapes through a heated die which compresses and cures the resinous tapes into a unitary laminated structure. The individual tapes are stored by winding them on reels, interleaved with a release tape. A method and apparatus for handling the release tapes are provided, in which such tapes are stripped away from and disposed of at a rate equaling, on the average, the rate at which the resin tapes are fed to the laminating die. An electromechanical resolver is coupled to one of the resin tapes and, as it is pulled from the reel toward the die, the resolver measures its longitudinal rate of travel by issuing a succession of electrical trigger signals, each trigger signal representing a predetermined distance of travel of the resin tape as it is withdrawn from the reel. A plurality of pull rollers are synchronously driven, with respect to the rate of dereeling of the resin tapes, by rotating the pull rollers in successive increments, each increment of rotation being effected in response to one of the successive trigger signals from the resolver and being produced by an air cylinder stroke advancing a continuous loop drive chain coupled to the pull rollers. Each increment of rotation of the pull rollers is selected to pull the release tapes by a distance equaling a predetermined increment of travel of the resin tapes associated with each resolver trigger signal.

15 Claims, 1 Drawing Figure

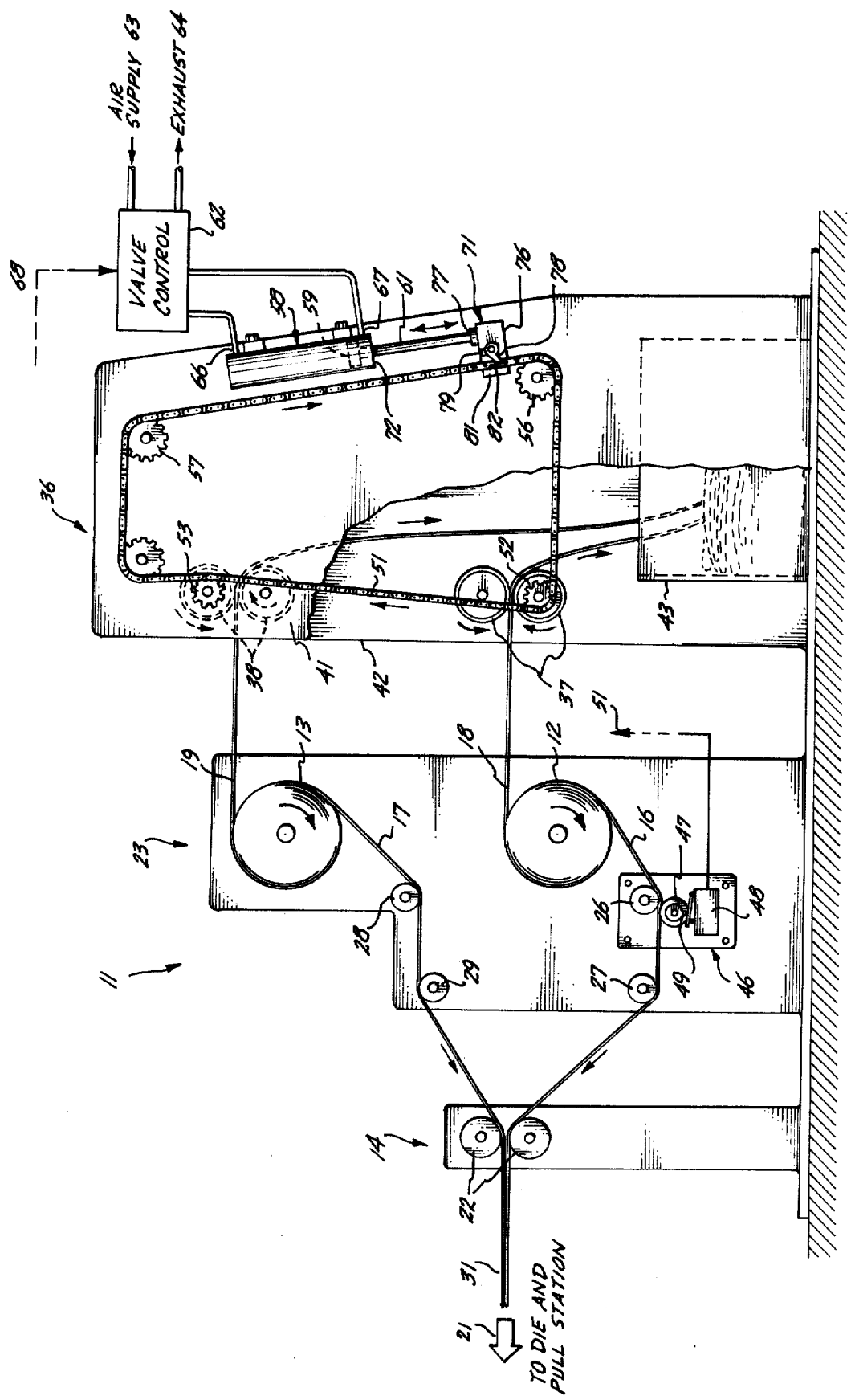

METHOD AND APPARATUS FOR DEREELING INTERLEAVED TAPES

BACKGROUND OF THE INVENTION

The present invention relates to automatic systems for handling the dereeling of interleaved tapes.

It is many times desirable to store and dispense tapes wound as multiple or interleaved layers on a common reel. For example, in a pultrusion process in which tapes of resin impregnated fibers are compressed under substantial heat and pressure to form laminated structures, it is desirable to supply the individual tape lamina or plies from multiple supply reels carrying the component resin tapes. Thus, in a pultrusion system and in general, in any process for laminating resin impregnated fibrous plies, the individual plies exhibit considerable tackiness, such that when supplied in elongate form and wound by itself on a reel, the windings tend to adhere to one another and are difficult to separate during dereeling. Examples of other laminating processes are found in U.S. Pat. No. 2,822,575 issued to R. Imbert et al. on Feb. 11, 1958, and U.S. Pat. No. 2,977,630 issued to Bagler on Apr. 4, 1961.

Because of this, resin tape plies are wound on storage reels with an interleaved release tape, typically a paper tape treated with a parting agent or other releasing agent. The interleaved release tape separates relatively easily from the sticky resin tapes and prevents the windings of the resin tape from adhering to one another. However, during the dereeling operation, the release tapes must be stripped from the resin tape and guided away from the dereeling station to a disposal facility. Even with the treatment of the release tape with the parting agent, there is still some residual stickiness and adherence of the release tape to the resin tape requiring the application of a stripping force to the release tape in order to effect its removal from the storage reel. Moreover, in a pultrusion laminating system, a multiplicity of the resin supply reels with the interleaved release tapes are simultaneously dereeled for supplying the plural lamina or plies to the pultrusion die station. This in turn requires the stripping away and disposal of a plurality of release tapes simultaneously with the dereeling of the plural resin tapes.

Furthermore, the source or supply reels of the resin and interleaved release tapes may be at varying stages or depletion, and the associated release tapes may be of varying sizes, e.g., width. Thus, for a given pultrusion operation, the release tape handling facility must accommodate tapes simultaneously from relatively large and small supply reels, and tapes of different widths, and maintain the proper synchronization to the pull rate of the dereeled resin tapes.

SUMMARY OF THE PREFERRED EMBODIMENT OF THE INVENTION AND ITS OBJECTIVES

Accordingly, it is an object of the present invention to provide method and apparatus for efficiently, economically and reliably handling interleaved tapes as they are unwound from a supply reel. More particularly, it is an object of the present invention to provide for stripping away and disposing of release tapes, wound in interleaved fashion with resin tapes, during the dereeling of a plurality of such resin tapes pursuant to a laminating process.

Although process and apparatus have been heretofore developed for handling the dereeling of interleaved tapes, such as exemplified in U.S. Pat. No. 3,136,462 issued to K. B. Knutson June 9, 1964; U.S. Pat. No. 3,429,761 issued to W. C. Bleher Feb. 25, 1969; and U.S. Pat. No. 3,360,210 issued to E. C. Frisbie Dec. 26, 1967, none of the heretofore known systems have been entirely satisfactory. For example, some of the known tape handling mechanisms, are intended solely for unwinding of a single reel of interleaved tapes. In other systems, the mechanism for synchronizing the dereeling of one of the tapes with another of the interleaved tapes have required mechanical coupling mechanisms directly coupling the dereeling of one of the tapes to a reeling mechanism for another of the tapes. Such mechanisms are not only trouble prone, but sometimes are impractical in view of a physical separation between the dereeling station and the facility for handling the plural interleaved tapes.

Briefly, the preferred embodiment of the present invention as disclosed herein provides a tape handling method and apparatus, particularly adapted for use in a laminating system, for elongate ply, such as a pultrusion system, in which a plurality of resin tape plies are simultaneously dereeled from a multiplicity of storage reels, each reel having a wound resin tape ply and interleaved therewith a release tape. The dereeling station, for example, may include a plurality of supply reels each rotatably mounted on a corresponding plurality of spaced apart axes or spindles. The resin tapes from these reels are jointly fed to a lay-up station which combines the individual tapes or strands into a composite union or lay-up of plies which is subsequently passed to a pultrusion station. At the pultrusion station, the lay-up of tape plies is pulled through a die and is simultaneously subjected to an elevated temperature which, together, form and cure the laminate into the desired structure. The operation proceeds at a pace determined by a pulling force applied to the finished laminated structure as it emerges from the pultrusion station. Thus the rate at which the individual resin tapes are dereeled is the same for all such tapes.

The handling facility in accordance with the preferred embodiment of the present invention includes a plurality of pairs of pull rollers rotatably mounted on axes generally parallel to and spaced from the supply reel axes for receiving and forcefully stripping the release tapes from the supply reels in synchronism with the dereeling of the resin plies. For this purpose, an electromechanical resolver is demountably coupled to one of the resin plies, herein in the form of a tape, for sensing the longitudinal advancement thereof. The movement of such resin tape responsively causes the resolver to issue a series of electrical trigger signals, each trigger signal corresponding to a predetermined linear displacement of the resin tape. The pull rollers of the tape handling facility are, in turn, incrementally rotatably driven through a drive chain and signal controlled pneumatic cylinder, with each increment of rotation effecting a displacement of the release tapes equal in length to the aforementioned predetermined linear displacement of the resin tape. Thus, the removal of the release tapes is automatically effected in synchronism with the feeding of the resin tapes. Although the pulling away of the release tapes occurs in increments, it will be observed that the summation of these increments over a period of time will equal, on the average, the linear rate of advancement of the resin tapes.

These and further features, objects and various advantages of the method and apparatus for dereeling interleaved tapes, according to the present invention, will become apparent to those skilled in the art from a consideration of the detailed description and appended drawings of an exemplary embodiment thereof.

BRIEF DESCRIPTION OF THE DRAWINGS

The single FIGURE of the drawings is a front elevational view of the apparatus for dereeling a plurality of reels of interleaved tapes in accordance with the preferred embodiment of the invention described herein.

DESCRIPTION OF THE PREFERRED EMBODIMENT

With reference to the drawing, the method and apparatus for dereeling interleaved tapes is illustrated in the environment of a pultrusion process, which is a particular method for laminating a plurality of resin tapes to form a desired composite structure. Here, only those portions of the pultrusion apparatus 11 for dereeling and processing the resin tapes preliminarily to the lamination thereof in a curing die are illustrated. For this purpose, the resin tapes are unwound from a plurality of supply reels, such as reels 12 and 13, and laid one upon the other in a device or mechanism sometimes referred to as a lay-up apparatus or lay-up station 14.

The composite lay-up of tapes is then forcefully pulled through a pultrusion die (not shown) which simultaneously compresses the tapes into a desired structure and applies curing heat to the resin material. The pulling force may be developed by a dual-clamp "hand-over-hand" pulling mechanism which continuously or intermittently draws the composite tapes through the die. Microwave or other heating may be used to apply the curing heat as the tapes pass through the die. Typically, the material is sufficiently cured upon its exit from the die that it will retain its formed shape.

The preferred and herein described embodiment of the present invention provides for facilitating the dereeling of resin tape or ply supply reels 12 and 13, and in particular to remove and dispose of the release tapes wound in interleaved fashion with the resin tapes for storage on the supply reels. Each of the plurality of supply reels 12 and 13 comprises a continuous winding of resin tape, namely tapes 16 and 17 of reels 12 and 13, and an interleaved tape, such as release tapes 18 and 19 also of reels 12 and 13 respectively. Although the resin plies are illustrated here in the form of tapes, it will be appreciated that any elongate ply which can be wound on a reel interleaved with a release tape may utilize the present invention to advantage.

The release layers or tapes 18 and 19 serve to prevent undesirable adhesion of the layers or windings of resin tapes 16 and 17 and are usually provided by a paper tape treated with a parting agent. Even with the parting agent, however, there is some tackiness or stickiness between the interleaved tapes such that during dereeling of present tapes 16 and 17 from reels 12 and 13, the release tapes 18 and 19 must be forcefully stripped from the associated resin windings. Also, the release tapes are desirably drawn off in a direction away from the lay-up station 14 and the downstream die and pull stations (not shown) so as not to become entangled in the operations thereof. In this instance, resin tapes 16 and 17 are drawn by the pulling force applied downstream of the pultrusion die (not shown) in the direction indicated by arrow 21, causing the individual tapes to be laterally aligned and laid, one upon the other, and pressed together face-to-face in a pair of counter-rotating pinch rollers 22 of lay-up station 14 to form a composite of such tapes.

Reels 12 and 13 are rotatably mounted on a tape feed or dereeling station 23 with their axes of rotation in this instance being in spaced apart parallelism so as to facilitate the alignment and lay-up of the dispensed resin tapes. Each resin tape is guided from its associated supply reel to lay-up station 14 by an idler or guide roller means, in this instance being provided by guide rollers 26, 27, 28, and 29. Although only two supply tape reels are illustrated here, it will be appreciated that dereeling station 23 may dispense any desired multiplicity of wound tapes. For example, as many as 20 or more supply reels may be mounted on a dereeling station, such as station 23, for supplying a corresponding member of tape components to the downstream laminating equipment.

It will be observed that the supply reels carried at station 23 may exhibit varying and different stages of depletion such that the associated supply reels will rotate at significantly different rates of rotation even though the linear or longitudinal feed rate of the various tapes is, by necessity, the same. In other words, as the composite or lay-up of tapes 31 is pulled in the direction of arrow 21 at a rate established by the die and pull station, the linear rate of displacement of each of the composite tapes is necessarily the same and equal to the pull rate. Preferably, a predetermined braking force or drag is applied to reels 12 and 13 which is overpowered by the pull force drawing the resin tapes from the reels. This maintains a suitable tension on the resin tapes. Also, it is many times desirable to supply resin tapes of different widths in order to form a particular laminated structure. In such case, the width of the associated release tapes may also vary. Thus, while dereeling station 23 is depicted here as rotatably mounting a limited number of tape supply reels of apparent uniformity in all respects, it will be observed that, in actual practice, station 23 may accommodate many different and varied sizes of supply reels and associated tapes, including variations in the outside diameter of the tape windings and in the width of resin and release tapes.

To automatically strip and guide the release tapes 18 and 19 away from the dereeling station 23, a tape handling station 36 is provided which, in this instance, is disposed on an opposite side of dereeling station 23 from lay-up station 14. Station 36 includes a plurality of pairs of pinch or pull rollers, such as pull rollers 37 and 38, for receiving and forcefully pulling release tapes 18 and 19 in a direction away from the associated supply reels 12 and 13. For this purpose, pull rollers 37 and 38 are mounted for rotation on a pair of upstanding spaced parallel frames 41 and 42 such that the rotational axes of each roller pair are mounted in spaced apart parallelism with respect to one another and, in general, are parallel to the rotational axes of supply reels 12 and 13 of dereeling station 23.

The opposed ends of the various rollers 37 and 38 are rotatably mounted on frames 41 and 42 with the spacing between the axes of each pair selected so that the outer roller circumferences are tangentially longitudinally engaged to receive therebetween, in "pinched" relationship, the respective release tapes 18 and 19 from station 23. As will be seen herein, the rollers of each pair are automatically and selectively driven in counter-rotation so as to pull the respective release tapes from their associated supply reels at a rate which, on the average, equals the linear feed rate of resin tapes 16 and 17 in the direction of arrow 21.

To accommodate a variety of release tape widths, the pull rollers 37 and 38, or at least one of each pair of rollers, are faced with an elastomer which is slightly compressible under the pinching force therebetween and which provides a friction surface for gripping and pulling the release tapes under tension.

To accommodate diverse widths of release tapes 18 and 19, pull rollers 37 and 38 are preferably elongate, having an effective length between frames 41 and 42 which is at least as wide as the maximum expected width of any one of the release tapes. Although tape handling station 36 and rollers 37 and 38 are disposed, in this instance, substantially rearwardly of the take-off direction for resin tapes 16 and 17, it will be appreciated that the tape handling facility of station 36 may be disposed at any convenient location adjacent station 23. Preferably however, station 36 is positioned so that release tapes 18 and 19 depart from supply reels 12 and 13 at a tangent spaced apart from the departure tangent of resin tapes 16 and 17. This conveniently positions the release tapes and the associated handling facility out of the way of the remaining downstream mechanisms of the system. Once the release tapes pass through pull rollers 37 and 38, they are, in this instance, caused to drop downwardly into a disposal bin 43. Alternatively, the release tapes may be rewound on auxiliary storage reels for disposal or reuse.

Pull rollers 37 and 38 are rotatably driven in successive increments of rotation which pull release tapes 18 and 19 from the dereeling station at a cumulative average rate equaling the longitudinal advancement or displacement of resin tapes 16 and 17 toward the die and pull station. Moreover this incremental advancement of the pull rollers associated with tape handling station 36 occurs only in response to commencement of actual longitudinal movement of resin tapes 16 and 17 and thereafter in synchronization with continuing advancement of the resin tapes.

For this purpose, a resolver means is coupled to one of the resin tapes, or to a composite of combined resin tapes, downstream of dereeling station 23 for sensing movement and rate of movement of such tape or composite. In this instance, the resolver 46 is provided by an electromechanical sensor detachably mounted to dereeling station 23 and including a slave roller 47 coupled to the longitudinal motion of tape 16 by forming a pinch roller co-acting with guide roller 26, with the tape pinched therebetween. Slave roller 47 thus serves as a means rotating in response to longitudinal movement of tape 16 in which each full rotation of roller 47 corresponds to a predetermined longitudinal travel or displacement of tape 16 equal to the roller's outer circumference.

Operatively associated with slave roller 47 is an electrical signal means including an electrical sensing means for sensing a given amount of rotation of slave roller 47, which here equals one full rotation, and issuing one of the successive trigger signals in response to each such given amount of rotation.

For economy of construction and reliability of operation, an electromechanical switch 48, such as a microswitch, may be mounted to cooperate with a radial cam 49 fixedly carried by slave roller 47 for actuating switch 48 every full rotation or "once around" of the slave roller. Thus, switch 48 and cam 49 serve as a means for sensing each full roller revolution and for producing the succession of electrical trigger signals in response thereto. This operation, in turn, measures the longitudinal travel of resin tape 16 which, as indicated above, is equal to the travel to all the remaining resin tapes. Accordingly, each time a signal is generated by switch 48, it is known that a predetermined amount of resin tape length has been dispensed by reels 12 and 13, such length equaling the outer circumference of slave roller 47. For continuous longitudinal advancement of the resin tapes over an extended time interval, the cam operated electromechanical switch 48 of the resolver means will issue a succession of electrical trigger signals having a frequency equaling the rate of resin tape travel. This signal is available at an output 51 as indicated and may be extended over an electrical control line to tape handling station 36 which may be physically spaced apart from dereeling station 23 and, thus, remotely controlled by the resolver means over the interconnecting control line.

Although the presently preferred embodiment disclosed herein, illustrates the resolver 46 in the form of a electromechanical sensor, it will be appreciated that any number of alternative resolver mechanisms and devices may be employed to perform this function. For example, electro-optical or electromagnetic means may be coupled to a slave roller, such as roller 47, for developing an electrical signal in response to a predetermined amount of rotation thereof. Also, the resolver means may be directly coupled or connected to guide roller 26 or any other roller driven by contact engagement with one or more of the resin tapes.

Paired pull rollers 37 and 38 of tape handling station 36 are rotated by a drive means, here provided by a closed loop, flexible chain drive member 51 and cooperating drive sprockets 52 and 53 and idler sprockets 56 and 57. The drive means includes incrementing means connected to and for longitudinally driving chain member 51 by predetermined longitudinal strokes or increments. In this case, the incrementing means is a signal controlled linearly reciprocating drive means which preferably is provided by a fluid cylinder 58 including a cooperating piston 59 and associated push rod member 61. Preferably, a pneumatic cylinder and cooperating piston are used for this function. A signal responsive air valve control 62 is employed for selectively communicating a pressurized air supply 63 and an exhaust 64 to opposite ends 66 and 67 of cylinder 58 in response to a control signal applied at input 68 from output 51 of the resolver means associated with dereeling station 23.

Cyliner 58 may be fixedly mounted to frame 41 of station 36 such that, in response to the operation of valve control 62, piston 59 and its associated push rod member 61 provide a linearly reciprocating member responsive to the succession of trigger signals from the resolver means at station 23. Push rod member 61 is connected to and for driving the flexible chain member 51 through a desired longitudinal stroke selected to impart the above-mentioned predetermined amount of rotation to pull rollers 37 and 38 which, in turn, results in the desired displacement of release tapes 18 and 19.

More particularly, the push rod member 61 is relatively elongate with one of its ends connected to piston 59 and the opposite end equipped with a unidirectional coupling means such as the here-illustrated ratchet mechanism 71 for selectively engaging and longitudinally driving member 51 in one direction of reciprocation of member 61. Cylinder 58, in cooperation with valve control 62, provides fully automatic cycling of push rod 61 and ratchet mechanism 71 carried thereby. Each full cycle consists of a forward drive stroke in which ratchet mechanism 71 is extended outwardly to a remote position relative to an end 72 of cyliner 58 and a return stroke in which the ratchet mechanism is retracted to a home position adjacent end 72. This cycle of reciprocation of piston 59, push rod 61 and ratchet mechanism 71 is fully automatic, and occurs in response to each successive trigger signal applied to valve control 62 from resolver 46. In this embodiment, the automatic cycling is achieved by alternately communicating air supply 63, as indicated above, to opposite internal chamber ends 66 and 67 of cylinder 58. However, in the alternative, a pneumatic cylinder may be rendered fully automatic by incorporating a return spring in the mechanism to continuously urge push rod member 61 and ratchet mechanism 71 to its home position.

Ratchet mechanism 71 may be provided by any number of suitable mechanical devices effecting unidirectional coupling between member 61 and the drive chain member 51 so long as the members are coupled during the drive stroke and decoupled or disengaged during the return stroke. Here, ratchet mechanism 71 inclues a bracket 76 fixedly connected to end 77 of push rod member 61 and carrying a pivotally mounted pawl 78 and a pawl stop 79. A guide 81 of bracket 76 provides a shoulder portion 82 against which chain member 51 rests in opposed relationship to pawl 78 for insuring proper engagement of pawl 78 with one of the chain links during the forward drive stroke. Stop 79 carried by bracket 76 limits the rotation of pawl 78 so as to cause its engagement with the chain link. During the return stroke, pawl 78 is allowed to rotate away from stop 79, disengaging itself from the links of chain 51 and allowing ratchet mechanism 71 to slide back over the chain member 51 to its home position adjacent end 72 of the cylinder.

The length of the drive stroke, associated with piston 59, push rod member 61 and ratchet mechanism 71 is selected to drive chain member 51 by a longitudinal increment indexed to the required amount of rotation of pull rollers 37 and 38 through drive sprockets 52 and 53. The required rotation is that which displaces the release tapes by an amount equaling the longitudinal advancement of the resin tapes associated with each trigger signal.

Preferably, the plurality of pairs of pull rollers 37 and 38 are jointly driven by the same chain member 51 so that a single pneumatic cyliner 58 can incrementally impart the necessary rotation to all of the roller pairs associated with the plurality of release tapes 18 and 19. For this purpose, rollers 37 and 38 are here arranged such that only one of the rollers of each pair is driven, in this instance being the individual rollers associated with drive sprocket 52 and 53, which cooperate with chain member 51 while the remaining roller of each pair rotates as a slave roller by virtue of its longitudinal engagement with the master or driven roller. Accordingly, chain member 51 is arranged to rotate the roller provided with the sprocket in a direction resulting in a pulling force on the associated release tape, as exemplified by driving the lower roller equipped with sprocket 52 in a clockwise direction as seen in the figure, resulting in a counterclockwise direction of rotation for the associated slave roller. The friction surfaces provided by the circumferential elastomer faces of the rollers, enhances the master-slave counter-rotation relationship between the associated pinch roller pairs to ensure that the release tapes are properly stripped from the dereeling station.

It is thus seen that the present invention provides a method of handling and disposing of interleaved tapes, especially release tapes unwound during dereeling resin tapes or plies, pursuant to a tape laminating process in which the release tapes are stripped away from the dereeling operation by incrementally rotating pull rollers which frictionally engage and, upon rotation, feed the tape away from the dereeling station for disposal. In order to pull the release tapes at a rate synchronous with the dereeling of the resin tapes, the method provides for sensing the displacement and rate of displacement of the resin tapes as they are advanced pursuant to the laminating procedure. The advancement of these resin tapes may be continuous or intermittent, slow or fast, or at any rate and time independently necessary for the laminating process. The sensing of displacement and rate of displacement is more particularly achieved by measuring these parameters for a single one of a plurality of the dispensed resin tapes, it being known that the rate of displacement of one of these tapes equals the longitudinal rate of displacement of all of such resin tapes.

In response to this sensing step, a succession or train of electrical trigger signals are developed, each such signal representing a predetermined interval or travel distance of the associated resin tapes. This train or succession of trigger signals is employed to incrementally rotatably drive the pull or pinch rollers acting upon the release tapes so as to impart a predetermined amount of rotation to the pull rollers in response to each such trigger signal. The predetermined amount of rotation is, in turn, selected so as to pull the release tapes through a distance correlated to the predetermined travel distance of the associated resin tapes as resolved in the foregoing step. For a variable rate of displacement of the resin tape, the succession of trigger signals will vary in frequency and cause a varying number of individual incremental rotations of the pull rollers, each such rotation pulling the release tapes through a fixed or known distance but varying in frequency according to the resolved trigger signal frequency.

Preferably, the step of incrementally rotating the pull rollers is achieved by longitudinally advancing a closed loop flexible drive member coupled to the pull rollers, such as drive chain 51, wherein each longitudinal increment of advancement of the chain is provided by a unidirectional ratchet coupling carried by a reciprocating piston and push rod of a pneumatic cylinder as above discussed.

It will be observed that although the release tapes are stripped away in increments, on the average, the take-up of the release tapes equals the longitudinal advancement of the resin tapes so that the handling station 36 is in synchronism with the pull rate of the composite resin tapes 31, whether it be intermittent, continuous, slow or fast.

While only a limited number of embodiments of the present invention have been disclosed herein, it will be readily apparent to persons skilled in the art that numerous changes and modifications may be made thereto without departing from the spirit of the invention. Accordingly, the foregoing disclosure and description thereof are for illustrative purposes only and do not in any way limit the invention which is defined only by the following claims.

The claims are as follows:

1. An apparatus for dereeling release tapes from a plurality of rotatably mounted resin ply supply reels, each wound with an elongate resin ply interleaved with one of said elongate release tapes, in which the resin plies are unwound and longitudinally advanced to a laminating station, comprising:

rotatably driven pull roller means engaging said release tapes and, upon rotation, pulling them from said reels;

resolver means coupled to one of said resin plies and including signal output means issuing successive trigger signals, each in response to a predetermined longitudinal advancement of such resin ply; and drive means connected to and for rotatably driving said pull roller means and including incrementing means connected to said resolver means for rotatably driving said roller means by a predetermined amount of rotation selected to pull said release tapes by a distance equal to said predetermined longitudinal advancement of said resin ply in response to each of said successive trigger signals issued by said output means of said resolver means, whereby said release tapes may be stripped off of each of said reels in successive increments which equal, on the average, the longitudinal rate at which said resin plies are withdrawn from said reels toward said laminating station.

2. The apparatus of claim 1, wherein said resolver means comprises:

resolver roller means disposed to engage said resin ply to which said resolver means is coupled and to rotate in response to longitudinal advancement thereof; and sensor means including electrical signal means having said output means, said sensor means cooperating with said resolver roller means and sensing a given amount of rotation thereof and issuing one of said successive trigger signals at said output means after each such given rotational amount, wherein said amount of rotation of said resolver roller means is correlated to said predetermined longitudinal advancement of said resin ply.

3. The apparatus of claim 2 in which said electrical signal means includes electromechanical switch means and said sensor means including radial camming means mounted to and for rotation with said resolver roller means, said camming means and said electromechanical switch means co-acting to actuate said electromechanical switch means in response to each said given amount of rotation of said resolver roller means, whereby said electromechanical switch means provides said succession of electrical trigger signals.

4. The apparatus of claim 2, wherein said sensor means issues one of said successive electrical trigger signals for each full revolution of said resolver roller means, and the circumference of said resolver roller means engaging said resin ply equaling in dimension said predetermined longitudinal advancement of said ply.

5. The apparatus of claim 1, wherein said drive means includes a flexible, closed loop drive member connected to and for rotatably driving said pull roller means, and said incrementing means includes a signal controlled linearly reciprocating means connected to said signal output means of said resolver means and further connected to said drive member for longitudinally displacing said drive member a given interval selected to impart said predetermined amount of rotation to said pull roller means in response to each of said successive trigger signals.

6. The apparatus of claim 5, wherein said incrementing means has a linearly reciprocating member responsive to each of said successive trigger signals to automatically cycle through a drive stroke and a return stroke, and said incrementing means further including unidirectional coupling means between said reciprocating member and said flexible drive member for engaged coupling therebetween during said member drive stroke to cause said longitudinal displacement of said drive member through said given interval and for effecting decoupling therebetween during said return stroke.

7. The apparatus of claim 6, wherein said linearly reciprocating means comprises a pneumatic cylinder, said reciprocating member being connected to and for movement with a piston provided in said pneumatic cylinder, and signal responsive pneumatic valve control means connected to said signal output means of said resolver means and coupled to said pneumatic cylinder to automatically drive said piston and said reciprocating member through a complete cycle including said drive and return strokes in response to each said trigger signal.

8. The apparatus of claim 1, wherein said pull roller means comprises:

at least one pair of elongate rollers, each mounted for rotation at opposed longitudinal ends with their axes of rotation disposed in spaced apart parallelism and their outer circumferences in tangential, longitudinal engagement for joint counter rotation, and wherein said roller axes are substantially parallel to and spaced at a distance from the axes of rotation of said supply reels, the outer circumference of at least one of said pair of rollers having a friction surface whereby said pair of rollers is adapted to receive said release tapes in pinched relationship between said engaged outer circumferences to grip and pull such tape from said reels upon joint counter rotation of said pair of rollers.

9. The apparatus of claim 8, wherein said pair of rollers being further defined by each having its outer circumferential face formed of an elastomer material serving as said friction surface.

10. The apparatus of claim 8, said pull roller means further comprising:

a plurality of said pair of rollers disposed in spaced apart relationship relative to one another, whereby each said pair of rollers may receive and pull one of said release tapes from said plurality of reels.

11. The apparatus of claim 10, wherein said drive means comprises:

an elongate flexible closed loop drive member connected to and for jointly rotating said plurality of pairs of rollers, and said incrementing means including a pneumatic cylinder for incrementally, longitudinally displacing said flexible drive member.

12. The apparatus set forth in claim 8, wherein one of said rollers of said pair of rollers is connected to said drive means for being rotatably driven thereby, and the remaining roller of said pair being driven as a slave by said driven roller of said pair through said tangential, longitudinally engaged outer circumferences.

13. The apparatus set forth in claim 10, wherein one roller of each of said plurality of pairs of rollers is provided with a drive sprocket cooperatively engaging an elongate, closed loop flexible chain member of said drive means.

14. An apparatus for removing one of a plurality of tapes from a reel of wound interleaved tapes in which said reel is unwound at varying speeds and times determined by an independent pulling force applied to another of said tapes, comprising:
   resolver means adapted to engage said second named tape for generating successive electrical signals in response to longitudinal displacement thereof wherein said successive signals have a frequency of occurrence equal to the rate of said longitudinal displacement;
   a pull roller means adapted to receive said first named tape therebetween as it is unwound from said reel;
   signal controlled pneumatic cylinder and piston means coupled to said resolver means and having a longitudinal drive stroke and a return stroke in response to each said signal issued by said resolver means;
   an elongated, flexible closed loop drive member connected to and for rotating said pull roller means to pull said first named tape in response to longitudinal displacement of said drive member; and
   ratchet means coupling said cylinder and said piston means to said drive member for engaging and longitudinally displacing such member in response to said drive stroke and disengaging said cylinder and piston means from said drive member during said return stroke.

15. In a pultrusion method in which a plurality of supply reels of wound resin plies and interleaved disposable release tapes are jointly dereeled to advance said resin plies to a die and pull station, the combination of steps therewith comprising:
   resolving the linear rate of advancement of said resin plies by producing an electrical trigger signal in response to the displacement of any one of said resin plies through a predetermined longitudinal distance;
   pulling said release tapes from said reels by an incremental longitudinal amount in response to each said trigger signal by applying said trigger signals to rotatably, incrementally driven pull rollers engaging and pulling said release tapes by said predetermined incremental amount.

* * * * *